United States Patent

Buecker et al.

[11] Patent Number: 6,084,187
[45] Date of Patent: Jul. 4, 2000

[54] FILTER BYPASS SWITCH

[75] Inventors: James W. Buecker, Peoria Heights; Richard L. Harris, Chillicothe, both of Ill.

[73] Assignee: Caterpillar Inc., Peoria, Ill.

[21] Appl. No.: 09/163,280

[22] Filed: Sep. 29, 1998

[51] Int. Cl.$^7$ ................................................... H01H 35/38
[52] U.S. Cl. ................................. 200/82 E; 200/81.9 M
[58] Field of Search ............................ 200/82 E, 82 D, 200/81.9 M, 82 R

[56] References Cited

U.S. PATENT DOCUMENTS

| | | | |
|---|---|---|---|
| 3,941,958 | 3/1976 | Flesburg | 200/82 R |
| 3,965,317 | 6/1976 | Gratzmuller | 200/82 E |
| 4,130,745 | 12/1978 | Hetzer | 200/82 E |
| 4,645,887 | 2/1987 | Whiting | 200/82 E |
| 4,752,658 | 6/1988 | Mack | 200/82 R |
| 4,792,651 | 12/1988 | Whiting | 200/82 E |
| 5,693,926 | 12/1997 | Cassidy | 200/82 E |

Primary Examiner—Renee Luebke
Attorney, Agent, or Firm—Haverstock, Garrett & Roberts

[57] ABSTRACT

A filter bypass switch for detecting a clogged or restricted flow condition in a filter such as an oil filter, the bypass switch including a housing having a passage extending therein, a plunger slidably positioned in the passage for movement therein, a wall in the housing closing the passage adjacent one end of the plunger, and a biasing member for urging the plunger to move in a predetermined direction relative to the housing wall. The present switch also includes a magnet attached or otherwise located on one end of the plunger for axial movement relative to the housing wall, and a reed switch having first and second relatively movable members located on the wall in axial alignment with the magnet, the first and second movable reed switch members being movable between open and closed circuit conditions when the magnet is moved by the plunger between positions that change the magnetic interaction between the magnet and the reed switch, the plunger being movable in the passage in response to the fluid pressure at the inlet of the filter.

14 Claims, 2 Drawing Sheets

FILTER BYPASS SWITCH

TECHNICAL FIELD

This invention relates generally to a filter bypass switch and, more particularly, to a filter bypass switch operative in response to the fluid pressure at the inlet portion of the filter.

BACKGROUND ART

Filter bypass switches are commonly used to monitor the condition of the oil filter or oil filter screen and to provide a warning to the operator when the oil filter becomes clogged or otherwise restricted. A typical oil filter housing group or arrangement includes a filter housing, an oil filter, a spring biased spool and a filter bypass switch, the filter bypass switch including a plunger which is disposed in a housing and adapted to reciprocate therein, and including a pair of screw terminals. When the oil filter is clean, the plunger associated with bypass switch is urged into a closed position by the spring loaded spool, one end portion of the plunger thus making contact with the pair of screw terminals and closing the switch formed by the screw terminals and the one end portion of the plunger. As sludge or dirty oil builds up and the filter becomes dirty or clogged, a differential pressure moves the spring loaded spool in the opposite direction away from the switch plunger and a second spring, the second spring being adapted to normally urge the plunger away from the screw terminals. The differential pressure moves the plunger out of electrical contact with the screw terminals thus opening the circuit between the one end portion of the plunger and the pair of screw terminals. When the filter bypass switch is open, the operator is provided with a warning that the filter is restricted or clogged.

With this type of filter bypass construction, movement of the plunger in and out of contact with the screw terminals as well as the force of the spring loaded spool pushing the plunger back into contact with the screw terminals may cause denting and/or other damage to the screw terminals as well as to the plunger contact surface, thereby causing intermittent electrical contact even when the plunger is in its closed position. Also, with this type of construction, the plunger contact surface and the screw terminal surfaces may become coated with a thin layer of contamination which may also cause an intermittent electrical condition. Still further, due to the particular construction of the screw terminals, oil leakage past the screw terminals may also occur.

Accordingly, the present invention is directed to overcoming one or more of the problems as set forth above.

DISCLOSURE OF THE INVENTION

The present filter bypass switch is a simple, more efficient switching device which includes a reed switch and a magnet, the reed switch and magnet being adaptable for detecting a pressure buildup within a filter system by monitoring the pressure at the inlet portion of the filter. As such, the present switch device provides an easily recognizable indication of a condition or state of a fluid in a filter system by monitoring pressure in the filter. When the fluid in the system becomes dirty or thickened and restricts and/or prevents flow into the filter itself, pressure will change and such change in pressure will cause a change to take place in the switching device in response thereto, thereby providing an easily recognizable indication of the clogged condition so that action can be taken to correct the situation before damage occurs.

BRIEF DESCRIPTION OF THE DRAWINGS

For a better understanding of the present invention, reference may be made to the accompanying drawings in which.

BEST MODE FOR CARRYING OUT THE INVENTION

Figure 1:
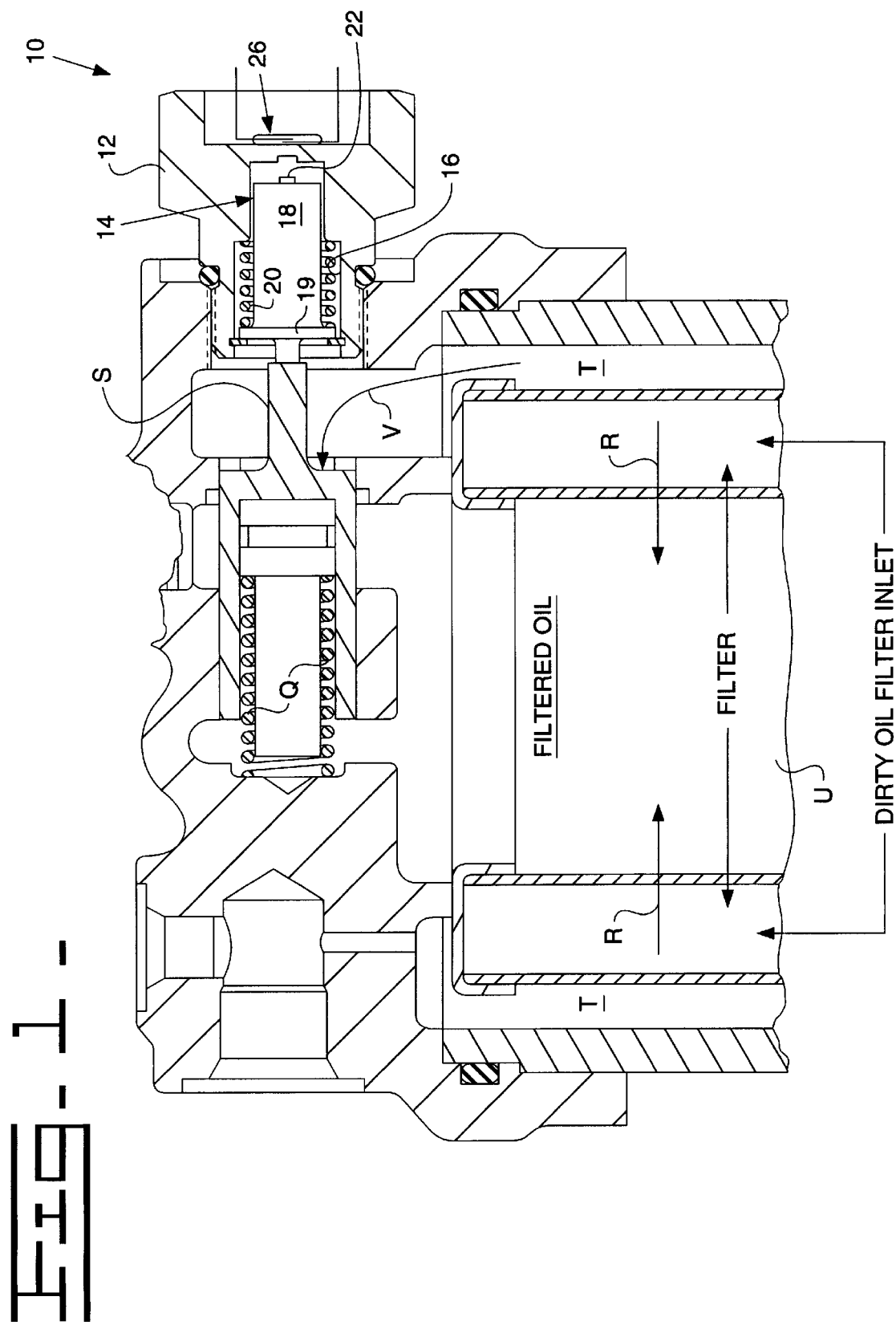
FIG. 1 is a cross-sectional view of a filter group arrangement showing use of the present filter bypass switch device therein.

Referring to the drawings, FIG. 1 is a cross-sectional view of a typical filter/bypass switch construction which includes the bypass switch device 10 of the present invention. The present switch device 10 is shown mounted into a passage associated with a typical filter system and into which extends a spring loaded bypass spool S. The bypass spool S, as will be hereinafter further explained, controls movement of the plunger assembly 14 associated with the present filter bypass switch 10.

Figure 4:
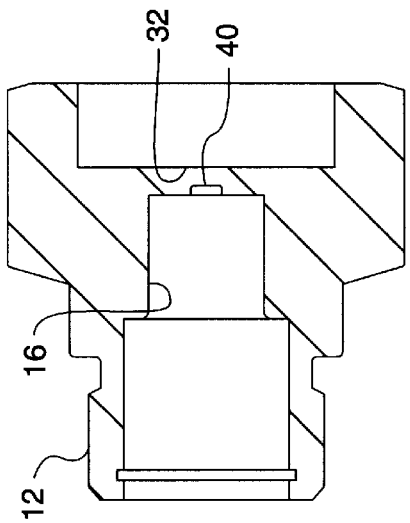
FIG. 4 is a cross-sectional view of the housing portion of the present switch device with the plunger and the reed switch portions not shown.
Figure 3:
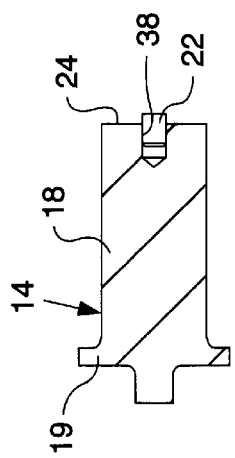
FIG. 3 is a cross-sectional view of the plunger portion only employed in the present switch device.
Figure 2:
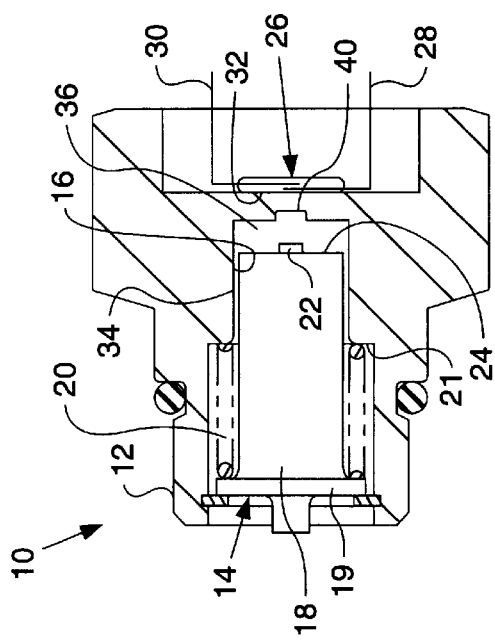
FIG. 2 is a cross-sectional view of the filter bypass switch device constructed according to the teachings of the present invention showing the present switch device in an open condition.

With particular reference to FIGS. 2–4, the filter bypass switch 10 generally comprises a housing 12 and a plunger assembly 14 disposed within a substantially cylindrical bore 16 in the housing 12. The plunger assembly 14 includes a plunger portion 18 which is movable in first and second opposite directions relative to the housing bore 16. A spring 20 surrounds the plunger 18 in the bore 16 and is provided to resiliently urge the plunger assembly 14 in a desired direction in the bore 16.

One end of the spring 20 abuts a fixed annular stop 21 in the bore 16 while the opposite end of the spring 20 abuts an enlarged annular plunger end portion 19 urging the plunger assembly 14 against the spring loaded spool S shown in FIG. 1 and towards an open position. It is recognized and anticipated that other biasing means may likewise be utilized in place of spring 20 without departing from the spirit and scope of the present invention.

The plunger assembly 14 includes a magnetic element, preferably a permanent magnet 22, which is fixedly and coaxially mounted on the plunger portion 18. The magnet 22 extends to or may even project outwardly from the plunger end surface 24 as best shown in FIGS. 2 and 3.

A reed switch 26 comprising two blades 28, 30 and associated lead connections is located on or attached to a housing wall 32 at the closed end of the housing bore 16. The reed switch 26 is positioned to be in substantial axial alignment with the magnet 22 so that the magnet position controls the opening and closing thereof.

During normal operation when the oil filter is not clogged, or otherwise restricted, dirty or contaminated oil will enter the oil filter and fill the annular inlet space T and thereafter move through the filter in the direction of arrow R into the center portion U of the filter as shown in FIG. 1. Clean filtered oil, or other fluid, will exit through the outlet portion of the filter. When this occurs, minimal differential pressure exists between spaces T and U and therefore substantially no pressure is exerted against the spring biased spool S. In this situation, the spring Q normally urges or biases the bypass spool S into engagement with the plunger assembly 14 and moves the plunger 14 within the housing bore 16 such that the plunger portion 18 will be fully extended toward the end wall 32 of the housing 12 in opposition to the force of return spring 20. This position of the plunger assembly 14 causes the reed switch blades 28, 30 to be magnetized by the magnet 22, attracting each other due to the closeness of the magnet 22 thereto, and thus closing the switch 26.

On the other hand, when the oil filter becomes restricted, or otherwise clogged, differential pressure across the filter in spaces T and U will increase, the pressure in inlet space T being greater than the pressure in space U because, in this situation, the dirty or contaminated oil is not allowed to flow through the filter into the space U. This condition causes a buildup of pressure along the flow path V and such pressure will exert a force against the spring biased spool S as shown in FIG. 1. When the pressure in the space T, namely, the inlet pressure in the filter multiplied by the area of the face of the spool S, and, exceeds the biasing force of spring member Q (FIG. 1), plus the force on the spool S from the fluid within space U, as described above, the bypass spool S will move away from the plunger assembly 14 which, in turn, allows the plunger assembly 14 to move away from the wall 32. This movement of the plunger assembly 14 is aided by the force of the spring 20. Due to this new position of the plunger assembly 14, the blades 28, 30 of the reed switch 26 are no longer positioned to be sufficiently magnetized by the magnet 22, with a consequence that the blades 28, 30 no longer attract or touch one another. Thus, the switch 26 is opened and the electrical connection therebetween is broken. Upon such breaking of the electrically conductive state of switch 26, such switch 26 will provide a signal indicative of a restricted flow condition in the filter and the operator may be provided with a warning in the operator compartment of such condition. In addition, operation of the fluid circulating system may be switched to a mode in which the filter is bypassed.

The present invention therefore provides a simple device for detecting a clogged filter. The filter bypass switch 10 may be actuated in response to a differential pressure i.e., the difference between the pressure at the inlet of the filter and the pressure at the outlet of the filter. More specifically, the operator is notified of a clogged or restricted filter when $$F_{in} - F_{out} \geq F_{spring1} - F_{spring2}$$

where $F_{in}$=force exerted on spool S by fluid at the inlet of the filter such as in the annular space T in FIG. 1;

$F_{out}$=force exerted on spool S by fluid at the outlet of the filter such as in the space U in FIG. 1.

$F_{spring1}$=the biasing force of the bypass spool spring Q shown in FIG. 1.

$F_{spring2}$=the biasing force of the spring 20 shown in FIG. 1.

Spaces 34 and 36 are provided along the side and end, respectively, between the plunger portion 18 and the housing bore wall 16 and between the plunger end surface 24 and the wall 32 as shown in FIG. 2. Upon movement of the plunger assembly 14 away from the end wall 32, fluid is allowed to flow along the side space 34 between the plunger portion 18 and the housing bore wall 16 and into the space 36. In this position of the plunger assembly 14, the magnet 22 is spaced from the reed switch 26 causing it to switch from a normal operating condition to the clogged condition. However, when the filter becomes unclogged, and the biasing force of the spool spring Q again exceeds the force exerted by the filter inlet pressure in space T, the bypass spool S will again move the plunger assembly 14 towards the wall 32 and the magnet 22 will cause the switch 26 to close. In this situation, the fluid present in the spaces 34 and 36 will act as a cushioning agent and will prevent the plunger end surface 24 as well as the magnet 22 from slamming into the housing wall 32.

The reed switch 26 used in the present device can have several different forms including being a reed switch 26 that is closed when a magnetic force is applied to it or a reed switch 26 which is open when a magnetic force is applied to it. In the one case the reed switch 26 will open when a clogged condition exists in order to shut off or open a circuit to a warning or alert device of some kind. In the other case, the opposite is true so that the reed switch 26 will close, and energize a warning device to indicate the clogged condition.

FIGS. 3 and 4 show various other features of the present device. For example, FIG. 3 shows the details of the construction of the plunger assembly 14 including a counterbore 38 which receives the magnet 22 such that the magnet 22 is located at or adjacent to the exposed end 24 thereof. FIG. 4 is a cross sectional view of the housing 12 showing the bore 16 therein into which the plunger assembly 14 is located. In the case where magnet 22 protrudes from end surface 24 of the plunger assembly 14 as shown in FIGS. 2 and 3, in order to prevent damage to the magnet, the housing 12 may include a small pocket or recess 40 (FIGS. 2 and 4) located in end wall 32 to receive and provide clearance for the magnet 22.

Industrial Applicability

As shown and described herein, the present filter bypass switch construction 10 utilizes filter inlet pressure at T and the force of the bypass spool spring Q operating on the plunger assembly 14 to move a magnet 22 that controls a reed switch 26 which can be opened or closed to produce a desired warning condition. The present device has many applications where filters such as oil filters and filter screens are used, and where such filters or filter screens need to be monitored so that a warning can be given as to when the filter or screen is clogged or otherwise restricted, or when an impending clogged condition is about to occur. These applications include stationary as well as mobile devices or systems such as, for example, a wide variety of construction and mining equipment including large earth moving machines, off highway trucks, wheel loaders, scrapers and other similar type machines and equipment.

In addition, the present filter bypass switch construction 10 is easily connectable to a wide variety of warning indicator systems for advising the operator that the filter may need to be changed, or otherwise requires maintenance. For example, the wiring harness associated with the particular machine can connect the present filter bypass switch 10 to an electronic monitoring system or to a computerized monitoring system in the operator compartment. Through one of these monitoring systems, the present switch 10 will warn the operator of a restricted or dirty filter in a conventional manner. Some machines may have more than one filter and may use more than one switch 10. In this situation, the switches 10 may all be connected to one alert or warning indicator on the monitoring system, or each individual switch 10 may be connected to a separate alert or warning indicator.

The present construction provides a much simpler design that monitors the pressure within the filter by a movable magnet 22 that controls a reed switch 26 based upon changes in the spacing therebetween.

Other aspects, objects and advantages of the present invention can be obtained from a study of the drawings, the disclosure and the appended claims.

What is claimed is:

1. A filter bypass switch operative to provide a signal indicative of a restricted flow condition in a filter, said filter including an inlet and an outlet, said bypass switch comprising a housing having a passage extending thereinto, a plunger slidably positioned in said passage for movement therein, said plunger being normally biased in a first direction within said passage, a biasing member for urging said plunger in a second direction within said passage, a wall in said housing closing the passage adjacent one end portion of said plunger, a magnet located on one end portion of said plunger adjacent said wall for axial movement relative thereto, and a reed switch having first and second relatively movable portions which are movable between open and closed circuit conditions when said magnet is moved by said plunger between positions that change the magnetic interaction between the magnet and said reed switch, said plunger being movable within said passage in response to a predetermined fluid pressure existing at the inlet of the filter.

2. The filter bypass switch, as set forth in claim 1, wherein said magnet is a permanent magnet.

3. The filter bypass switch, as set forth in claim 1, wherein the signal indicative of a restricted flow condition in the filter corresponds to said reed switch being in its open circuit condition.

4. The filter bypass switch, as set forth in claim 1, wherein the signal indicative of a restricted flow condition in the filter corresponds to said reed switch being in its closed circuit condition.

5. The filter bypass switch, as set forth in claim 1, wherein said plunger is normally biased in its first direction by a spool member engageable with the end portion of said plunger opposite said housing wall.

6. The filter bypass switch, as set forth in claim 5, wherein the spool member normally biases said plunger so as to produce a closed circuit condition.

7. A filter bypass switch for detecting a restricted flow condition in a filter, said bypass switch being used in conjunction with a spring biased spool member, said bypass switch comprising a housing having a cylindrical passage extending thereinto, a plunger slidably positioned in said cylindrical passage for movement therein, a wall in said housing closing one end of said cylindrical passage, a biasing member engageable with said plunger and with said housing for urging said plunger to move in a direction away from said wall, the spool member urging said plunger to move in a direction towards said wall, a portion of said plunger extending to adjacent said wall, a magnet attached to said portion of the plunger extending adjacent to said wall for axial movement relative thereto, and a reed switch mounted adjacent said wall in axial alignment with said magnet, said reed switch having first and second relatively movable portions which are movable between open and closed circuit conditions when the magnet is moved by said plunger between positions that change the magnetic interaction between said magnet and said reed switch, the spool member normally biasing said plunger so as to produce a closed circuit condition, the spool member being movable in a direction away from said plunger in response to a force exerted on the spool member due to the fluid pressure at the inlet of the filter whereby said biasing member engageable with said plunger moves said plunger in a direction away from said wall so as to produce an open circuit condition.

8. A switch, comprising:

a housing having a passage and a wall at an end of the passage;

a plunger disposed at least in part within the passage and operable to move within the passage as a function of a force applied to a first side of the plunger;

a first biasing member coupled with the plunger and operable to bias the plunger away from the wall;

a magnet coupled with a portion of the plunger adjacent the wall;

a reed switch coupled with the wall and having a first portion and a second portion, the second portion being relatively movable with respect to the first portion, and operable to move between a first position and a second position when the magnet is moved by the plunger between a third position and a fourth position;

a spool operable to receive a fluid having a first pressure on a first side and a fluid having a second pressure on a second side, the spool coupled with the plunger and operable to exert a force on the first side of the plunger as a function of the pressures of the fluid on the first and second sides of the spool; and a second biasing member coupled with the spool and operable to bias the spool towards the plunger.

9. The switch of claim 8 wherein the first side of the plunger comprises the side furthest from the wall.

10. The switch of claim 8 wherein one of the third and fourth positions of the magnet comprises a position wherein the magnet exerts a magnetic force insufficient to cause the second member of the reed switch to come into contact with the first member of the reed switch and the other of the third and fourth positions comprises a position wherein the magnet exerts a magnetic force sufficient to cause the second member of the reed switch to come into contact with the first member of the reed switch.

11. The switch of claim 8 wherein the force on the first side of the plunger is a function of a first fluid pressure multiplied by a first predetermined area.

12. The switch of claim 11 wherein the passage is operable to contain a fluid, and the sizing of the plunger relative to the passage is operable to restrict the flow of fluid from a side of the plunger closest to the wall when the plunger moves within the passage towards the wall, the restriction of the fluid flow operable to slow the movement of the plunger towards the wall.

13. The switch of claim 8 wherein the force on the first side of the plunger is a function of a second fluid pressure multiplied by a second predetermined area.

14. A switch for detecting a flow condition in a fluid filter having an inlet portion and an outlet portion, comprising:

a housing having a passage and a wall at an end of the passage;

a plunger disposed at least in part within the passage and operable to move within the passage as a function of a force applied to a first side of the plunger;

a first biasing member operable to bias the plunger away from the wall;

a magnet coupled with a portion of the plunger adjacent the wall;

a reed switch coupled with the wall and having a first portion and a second portion, the second portion being relatively movable with respect to the first portion, and operable to move between a first position and a second position when the magnet is moved by the plunger between a third position and a fourth position;

a spool operable to receive a fluid from the inlet portion of the filter on a first side and a fluid from the outlet portion of the filter on a second side, the spool coupled with the plunger and operable to exert the force on the plunger as a function of the fluid pressures on the first and second sides of the spool; and a second biasing member coupled with the spool and operable to bias the spool towards the plunger.

* * * * *